Nov. 2, 1971   J. A. LAFUENTE ET AL   3,616,831
PUNCTURE PROOF OR UNDEFLATABLE TIRE
Filed Feb. 25, 1969   4 Sheets-Sheet 1

INVENTORS
Jose Amestoy Lafuente
Juan Antonio Leon Melero
BY   Karl W. Flocks
ATTORNEY

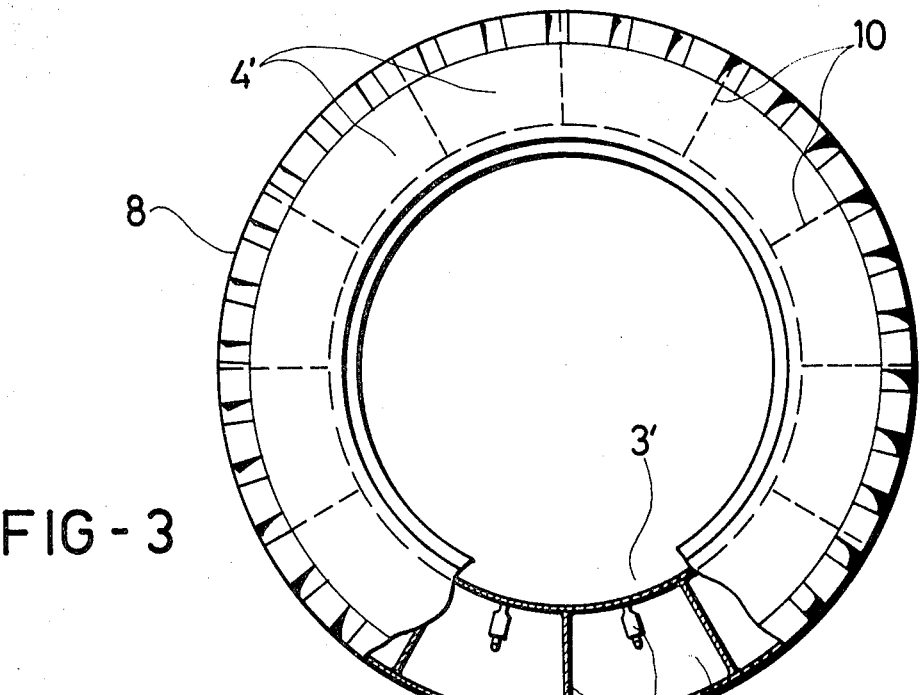
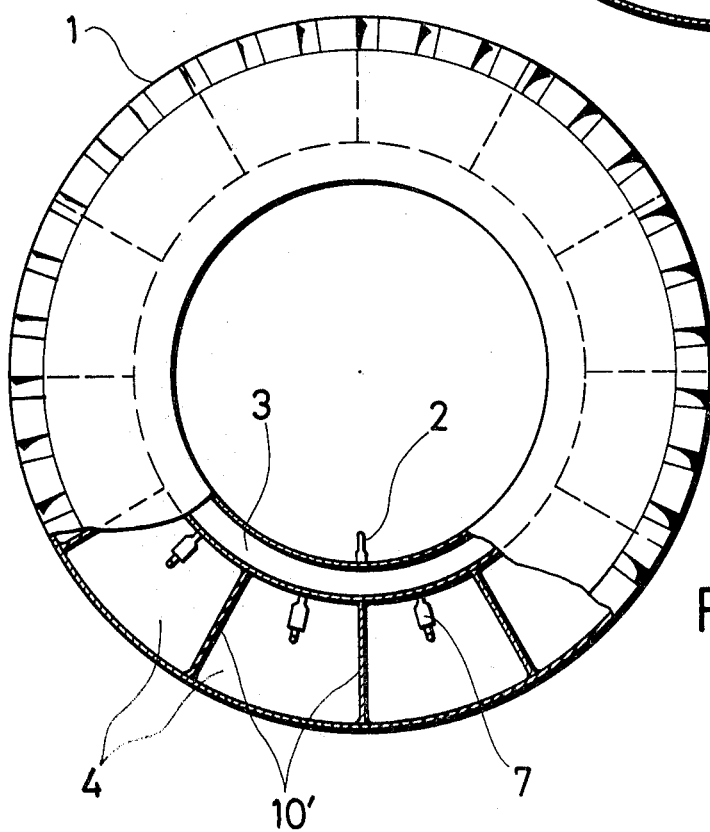

United States Patent Office 3,616,831
Patented Nov. 2, 1971

3,616,831
PUNCTURE PROOF OR UNDEFLATABLE TIRE
Jose Amestoy Lafuente and Juan Antonio Leon Melero, both of Avenida Reina Victoria, 40 Madrid, Spain
Filed Feb. 25, 1969, Ser. No. 802,069
Claims priority, application Spain, Feb. 29, 1968 (utility model), 136,679
Int. Cl. B60c 5/06
U.S. Cl. 152—342
5 Claims

ABSTRACT OF THE DISCLOSURE

Puncture proof or undeflatable tire which may be of the tubed or tubeless variety but in either event provided with a plurality of substantially air-tight cells adjacent a manifold which is adapted to have a normal inlet from the exterior of the tire through a tire valve which may pass through the wheel rim and wherein the manifold is connected to each of the cells through a valve which permits air to pass through the manifold to a cell when the pressure of a particular cell has critically dropped due to a puncture or a rupture of a wall thereof. The tires in accordance with the instant invention may also include a special valve located between each cell in the manifold of such a nature as will permit air from the manifold to be passed to a cell which has lost air and will also permit air to be passed from the cell back to the manifold when the manifold pressure has been relieved by opening its inlet valve.

---

This invention concerns an undeflatable tire. Its special structure is directed toward avoiding accidents which result from the classic tire burst.

It is well known that, immediately after a tire bursts on any of the wheels, road accidents, from this cause, arise from a great lack of stability in the car and leads to loss of driving control.

The general problem which is implied by the use of conventional tires, either with or without a chamber, is that, due to the tire's structure, there is only one compartment into which the air is introduced at an adequate pressure. If by chance there is a tear in any part of the cover, in other words the tire, the air escapes rapidly, giving rise to the loss of stability referred to above and possibly to the overturning of the car.

In an attempt to solve this problem, some types of tires reduce to a greater or lesser degree the danger of being suddenly left without any air in one of the tires.

It has been suggested that a possible attempt at a solution to this problem would be to divide the air chamber into various air tight compartments. In this way, the danger of losing all the pneumatic pressure as a result of a burst would be eliminated, as in such an event only the air in the affected compartment would escape.

The prior burst proof tires are based on this idea, but they in turn present an unsolvable problem. This is that in order to completely blow up the tire, it is necessary to apply pressure separately to each one of the independent chambers. For this reason, these subdivisions or compartments have their own valves to which the tire pump nozzle is applied separately. It is obvious of course that this operation is slow and tiresome.

On the other hand, these subdivided tires are fitted with a maximum of six air tight compartments, so that if one of them bursts, although only one of these compartments is affected, the fall in the amount of air is appreciable, as it would be equivalent when least, to ⅙ of the total amount of air. Consequently, if the number of compartments is increased, the proportion of air lost through a burst diminishes, but, on the other hand, the number of valves for independent inflation is increased. Therefore, the blowing up operation of the tires becomes even more tiresome.

Therefore, the ideal tire would be the one which had the advantages of the above but without their disadvantages; in other words, that it should only be necessary to use one valve when inflating the different compartments.

It would also be an advantage if this ideal tire were fitted with a large number of subdivisions, so that in the possible event of a burst, the affected portion should be as small as possible.

The undeflatable tire, in accordance with this invention, fulfils these characteristics and it also involves subdivisions both in the transversal as well as in the longitudinal sense. The tire is inflated by applying pump nozzle to the single external valve, which introduces pressure into the first interior peripheral compartment. When the pressure in this compartment reaches a certain level, then the air is simultaneously introduced into the remaining subdivisions, which are equipped with special valves.

These characteristics, as well as others pertaining to the invention, will be more clearly indicated in the following detailed description, taken in conjunction with the attached drawings. It is to be expressly understood that these drawings have been used only for the purpose of illustration and do not attempt to give a definition of the limits of the invention. In this respect, we would refer you to the claims given at the end of this description.

FIG. 3 is a side elevation of a tire shoe with portions broken away. In this form the tire is tubeless.

FIG. 4 is a view similar to that shown in FIG. 3 but particularly illustrates a tire of the tubed type;

Figure 1:
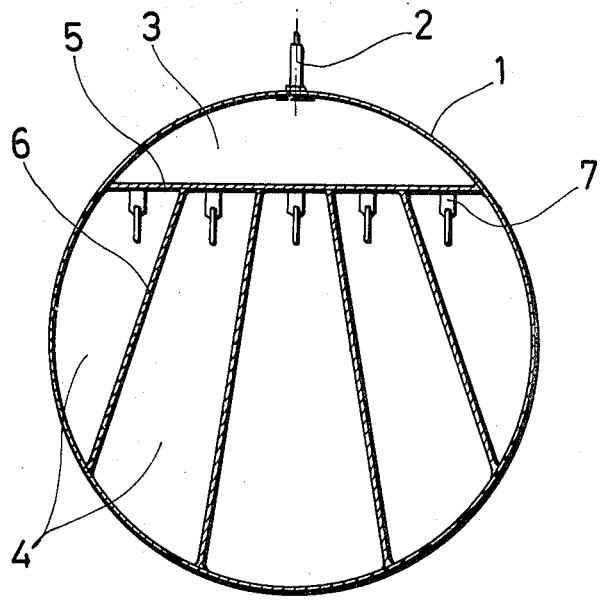
FIG. 1 is a schematic cross section taken through one-half of a tire schematically illustrating the manifold in relation to the individual cells formed by the partitions.

FIG. 1 illustrates a transversal section of chamber 1, in accordance with the invention. A conventional valve 2 can be seen at one end of the section, protruding outside. There is a partition 5 inside which gives rise to the formation of a peripheral compartment 3. The partitions 6 extend from partition 5 and subdivide the rest of chamber 1 into other new compartment 4, independent from each other, and from 3. Each one of the divisions is equipped with a valve 7, whose original structure is explained further on.

Figure 2:
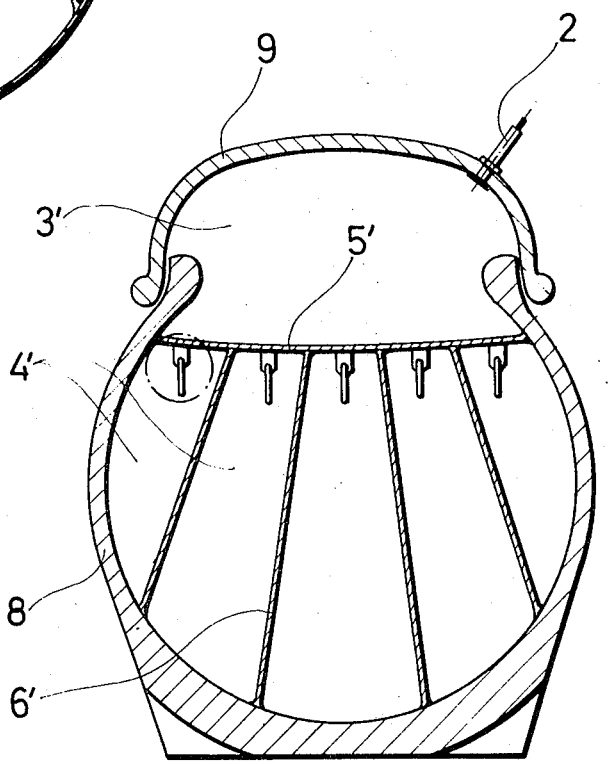
FIG. 2 is a view similar to FIG. 1 of a tubeless tire portion in accordance with the invention.
Figure 8:
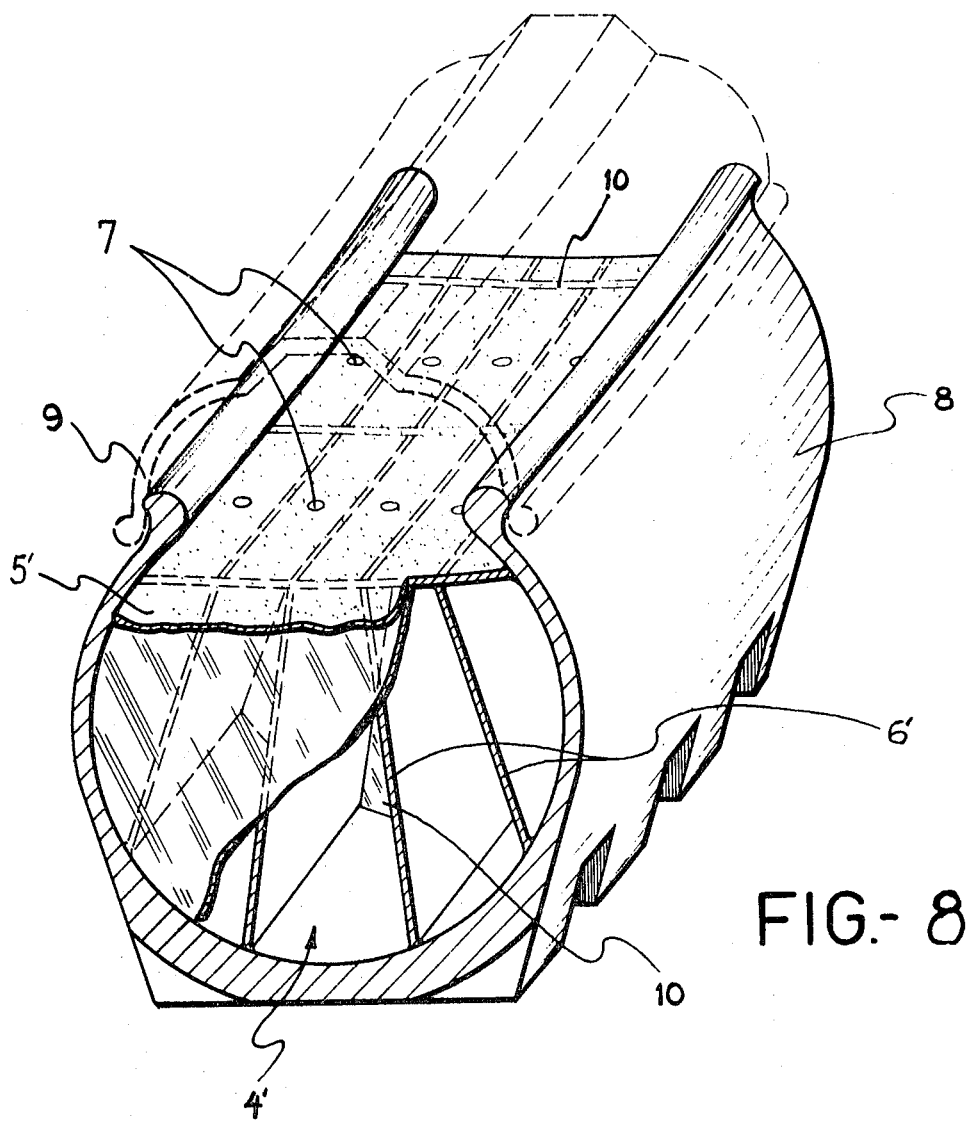
FIG. 8 is a view in perspective and partially in section of the tire of FIG. 2.

FIGS. 2 and 8 illustrate a transverse section of a "tubeless" chamberless type tire and present an analogous disposition to FIG. 1. The shoe 8, mounted as is usual on the rim or metallic disc 9, presents a partition 5' similar to 5 in FIG. 1. In the same way, there is a peripheral compartment 3' between partition 5' of the shoe 8 and the internal face of the rim 9. There are also subdivisions 4' equipped with valves 7, formed by partitions 6', similar to the 6 in FIG. 1.

A view in side elevation, partially in section, of a shoe according to the invention, is shown in FIG. 3. The radial partitions 10 subdivide the compartments 4' which in this way do not occupy the whole length of the circular crown which shapes the shoe. This kind of circular crown is divided up into independent sectors, fitted out with valves 7.

FIG. 4 illustrate a similar view as FIG. 3, but is directed to a chamber according to the invention, instead of a shoe shown in the latter. In FIG. 4, radial partitions 10' divide up the peripheral compartments 4 in air tight portions equipped with valves 7.

Figure 5:
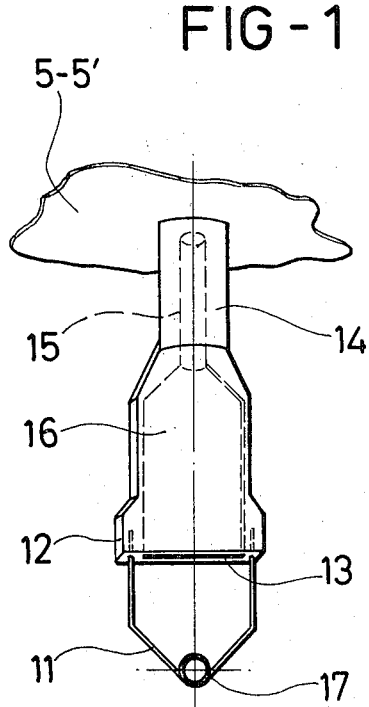
FIG. 5 is a view in detail of the valve installed in a cell or compartment in the tire or tire tube.

FIG. 5 is a detailed illustration of one of the types of valves which can be installed in each one of the compartments into which the chamber ore shoe is subdivided according to the invention.

Figure 6:
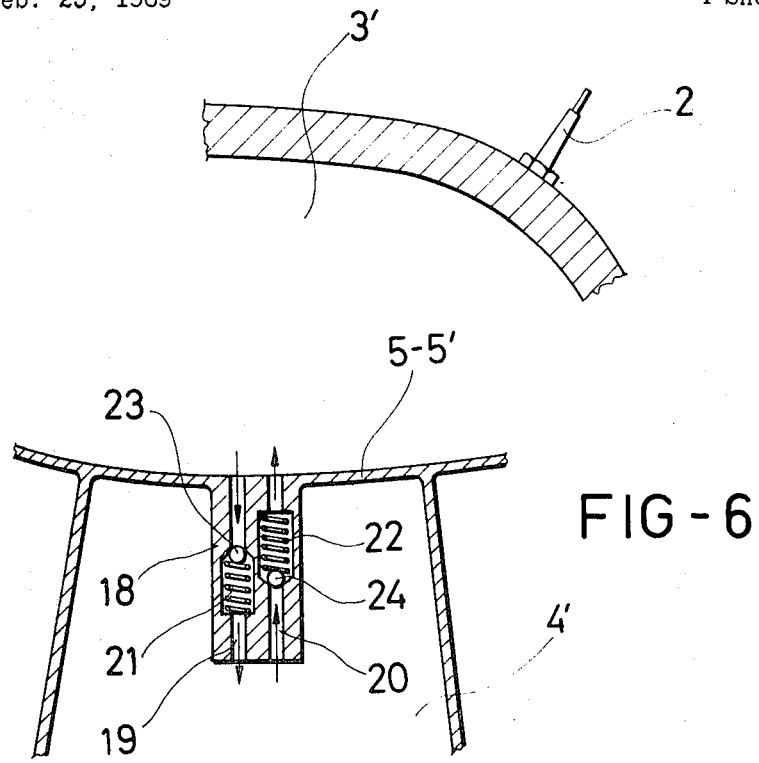
FIG. 6 is a schematic sectional view of a preferred valve form which has a reversible action.

FIG. 6 illustrates a detail of a type of valve which may preferably be used in a commercial form of the invention. This valve has a reversible action which we shall explain below.

Figure 7:
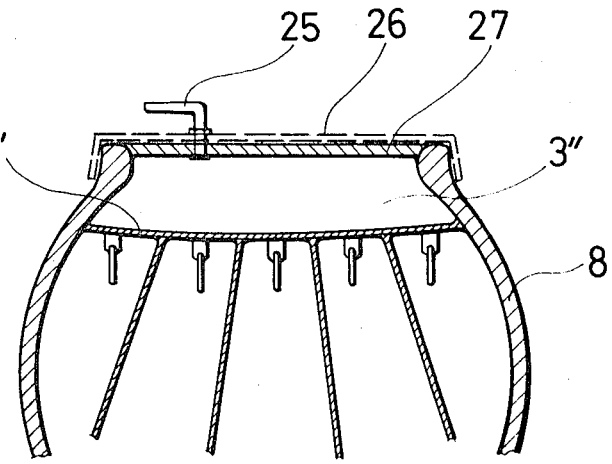
FIG. 7 is a schematic fragmentary transverse sectional view of a tubeless tire of a character adapted to be used on trucks.

FIG. 7 illustrates a view of a tire 8 without innertube chamber, especially for use on heavy vehicles, such as trucks or lorries. It presents the peculiarity of forming a peripheral chamber 3", on the base of a partition 5' similar to the one shown in FIG. 2 and another higher base 27, which should be thicker than 5'. Partition 27 will be in contact with the metallic rim 26 of the truck or lorry wheel, which incorporates the valve 25 conventionally used on this type of vehicle.

The valve in FIG. 5 has a neck 14 perforated axially according to 15. The neck 14 continues to expand into a generally prismatic portion 12 which is hollow according to 16. This prolonged body 12 is not very thick, and in the lower base, open at the groove 13, the ends of a kind of fork 11 are laterally installed. The arms of this fork try to keep apart, due to the elasticity of the material itself, which plays the role of a spring at point 17.

Whether the tire has an inner tube or is tubeless, the working is the same. To simplify the explanation, we shall initially refer now only to the tire without an innertube chamber. The air will be communicated, through 2, to chamber 3'. FIG. 2, where it will reach, for example, a pressure of 1½ atm. When this happens valves 7, tuned to that pressure, will begin to admit through the orifice as the force of spring 11 will have been overcome by the effect of the air trying to get in. Until that moment, the force of spring 11 had stopped the edges of groove 13 from separating. When the tension of this spring is overcome, the air in chamber 3' begins to fill compartments 4', until these acquire the required amount of air, indicated in each particular case, in accordance with the role the tire has to play. When the required pressures has been reached, air will cease to pass through the conventional valve 2.

From the structure of valve 7, FIG. 5, you will see that the air in the compartments 4' cannot pass into chamber 3' as the pressure which surrounds this valve, as well as the action of the spring 11, keep the walls of the tubular body in the form of a wedge 12, stuck one to the other all along its extension.

When there is a tear at one point in the surface of a tire according to this invention, the affected compartment will be emptied and then the air pressure in 3 will force the corresponding valve 7 to open, supplying air, until the pressure in chamber 3' is balanced with the tension of spring 11 which we put at 1½ atm. in the previous example. At that moment, general compartment 3' will stop losing pressure.

With the type o fvalve shown in FIG. 5, one who inflates the tire must do so with some considerable care, for if one accidentally exceeds the tire's working pressure, it is impossible to extract the excess air from cells 4', since this valve (FIG. 5) only allows air to pass through in one direction.

For this reason the tire according to this invention preferably is fitted with a reversible type valve in association with the air tight compartments. Such a valve is one which permits the passage of air in both directions, inward and outward.

FIG. 6 illustrates a view of the reversible valve, which would preferably be used the when the invention is put into practice. This valve consists of a body 18, with two orifices or passage galleries 19 and 20. Gallery 19, in its central expanded area, incorporates a spring 21, which stands firm against a seat above a small sphere 23. Gallery 20 has a similar disposition, but in the opposite direction. Furthermore, springs 21 and 22 are tuned to a different tension. This valve works as follows:

The air penetrating through 2 into chamber 3' provides the latter with sufficient pressure, so that at a given moment it overcomes the spring snap 21, obliging the sphere 23 to separate from its seat and consequently letting air into compartment 4'. If the working pressure of the tire is exceeded for some reason during inflation, due for example to an oversight on the part of the person inflating the tire, you need only manipulate the conventional valve 2 for the air to escape from 3', whilst the excess pressure in 4' will overcome the force of spring 22, which will be greater than that of 21, separating the small sphere 24 from its seat. Then the excess air in 4' will escape through gallery 20 to chamber 3', and from here into the atmosphere by means of the conventional valve 2. The tension of spring 22 is calculated so that it can only be overcome when the pneumatic pressure in 4' is higher to that of the spring itself, plus that existing in 3'. In this way, when the air pressure contained in subdivision 4' is correct, spring 22 will force the sphere 24 to stick to its seat, stopping the air from passing from compartment 4' to 3'. At that moment, the general chamber 3' can continue to be emptied of its own content. In such an event you need only apply air to same once more, in the correct amount.

From the above, it will be understood that in the event of a burst, a tire, according to the invention, which is equipped with valves such as the one described, will react, in such a case, in the same way as that indicated for a tire with valves such as those shown in FIG. 5.

When there is a tear in any of the compartments containing the valve of FIG. 6, these valves will react as follows: The air in the affected compartment 4' will escape rapidly and then the pressure of the content in 3', higher than the tension of spring 21, will pass into said compartment 4', until the tension of 21 is equal to or greater than the pneumatic pressure of the rest of the air contained in 3'. At such a time, the small sphere 23 will once more stick to its seat and consequently the total volume of air in the tire will have fallen slightly, a decrease equivalent only to the air lost from the torn compartment, plus a small amount of the total pressure contained in chamber 3'.

When a tire according to this invention is equipped with at least 60 air tight compartments, the loss of air, in the above case, have been approximately ⅟₆₀ of the correct working volume. This tiny decrease in air is not enough for throwing the vehicle off balance and, therefore, the driver will not lose control of same and we could even say that he may not even notice what has happened.

In such circumstances, the danger implied up to now of having a burst tire when the vehicle is moving at speed, no longer exists.

A tire according to this invention can be used on all types of vehicles with attendant advantages. For example, if such tires are used on aircraft, accidents will be avoided which otherwise might occur on landing due to burst tires on the undercarriage wheels.

A principle feature of the invention is to produce tires with compartments in accordance with the characteristics already indicated by way of example for the tubeless tire.

In other words, the different compartments will be made inside the shoe itself.

With this type of tire, the problem of patching up a puncture hole would be resolved in the usual manner as for the already known "tubeless" or "chamberless" tires. That is, once the puncture hole has been located, it is only necessary to apply a mushroom shaped plug in such a way that the head of the plug is left toward the inside face of the shoe, in the same way as is done with tires without chambers used at the moment.

It will be obvious to those skilled in the art that various changes may be made without departing from the scope of the invention and therefore the invention is not limited to what is described in the specification.

What is claimed is:

1. A tubeless puncture proof or undeflatable tire for use with a wheel member of a vehicle wherein said tire comprises a shoe portion having internally thereof a generally annular partition extending transversely of the tire from side wall to sidewall to define an inner radial portion and an outer radial portion, said outer radial portion including a plurality of generally radially and annularly extending partitions which divide said outer radial portion into a plurality of annular compartment sections, and said outer radial portion also including a plurality of generally radially and transversely extending partitions which further divide said plurality of annular compartment sections into a multiplicity of independent cells around and transversely of the tire, with said inner radial portion forming an annular manifold chamber with the rim of the wheel member upon which it is mounted and each of said independent cells communicating with said annular manifold chamber through individual valve means in the generally annular partition extending transversely of the tire, said valve means being a double reversible valve comprising a body with two passage orifices, which body is enlarged in its middle section wherein a small sphere is installed at each passage orifice, a spring pressing each sphere against a seat in each orifice, one of said orifices being an air inlet from the manifold chamber to each cell and the other of said orifices being an outlet from each cell to said manifold chamber.

2. A puncture proof or undeflatable tire in accordance with claim 1 wherein the valve spring in the admission passage of each valve has a tension less than that of the outlet passage spring.

3. A puncture proof or undeflatable tire in accordance with claim 1 wherein said manifold chamber is also provided with an inlet valve whereby air from the atmosphere may be passed to said manifold chamber until the necessary pressure is reached for overcoming the tension of the admission passage spring of each of the valves in the independent cells while the pressure in the independent cells in association with the outer passage spring holds the valve closed so that at this time air may not be passed from the individual cells to the manifold chamber.

4. A puncture proof or undeflatable tire in accordance with claim 3 wherein means are provided in the valve controlling the supply of air to the manifold chamber for relieving the manifold chamber of air pressure so that the pressure within the individual cells is greater than the pressure within the manifold chamber causing the outlet valve between the individual cells and the manifold chamber to open and relieve the individual cells of excess pressure.

5. A puncture proof or undeflatable tire in accordance with claim 3 wherein when the tire wall is ruptured, the affected cell or cells will lose air pressure causing the admission passages in the reversible valves to open in response to the superior pressure in the manifold chamber so as to overcome the inlet passage spring.

References Cited

UNITED STATES PATENTS

| | | | |
|---|---|---|---|
| 1,858,094 | 5/1932 | Irvz | 152—331 |
| 600,828 | 3/1898 | Carter | 152—331 |
| 754,645 | 3/1904 | Du Pont | 152—331 |
| 924,812 | 6/1909 | McArthur | 152—331 |
| 2,070,066 | 2/1937 | Picardi | 152—331 |
| 1,438,256 | 12/1922 | Munjell | 152—342 |
| 2,554,815 | 5/1951 | Church | 152—342 |
| 3,126,936 | 3/1964 | Beckadolph | 152—341 |

FOREIGN PATENTS

| | | | |
|---|---|---|---|
| 932,419 | 11/1947 | France | 152—331 |

ARTHUR L. LA POINT, Primary Examiner

R. A. BERTSCH, Assistant Examiner